(12) United States Patent
Trussel et al.

(10) Patent No.: US 10,326,725 B2
(45) Date of Patent: Jun. 18, 2019

(54) SYSTEMS AND METHODS FOR MOBILE COMMUNICATION INTEGRATION

(71) Applicant: Glympse, Inc., Seattle, WA (US)

(72) Inventors: Bryan Gardner Trussel, Seattle, WA (US); Stephen Miller, Seattle, WA (US); James Stanton, Seattle, WA (US); Jason Kiemeg, Seattle, WA (US); Craig Link, Seattle, WA (US)

(73) Assignee: Glympse Inc., Durham, NC (US)

( * ) Notice: Subject to any disclaimer, the term of this patent is extended or adjusted under 35 U.S.C. 154(b) by 0 days.

(21) Appl. No.: 14/661,961

(22) Filed: Mar. 18, 2015

(65) Prior Publication Data
US 2015/0195235 A1    Jul. 9, 2015

Related U.S. Application Data

(63) Continuation of application No. 13/735,840, filed on Jan. 7, 2013, now abandoned, which is a
(Continued)

(51) Int. Cl.
*H04L 12/58* (2006.01)
*H04M 3/533* (2006.01)
(Continued)

(52) U.S. Cl.
CPC .............. *H04L 51/20* (2013.01); *G01C 21/00* (2013.01); *G01C 21/3438* (2013.01);
(Continued)

(58) Field of Classification Search
CPC .......... H04W 4/02; H04W 4/12; H04L 51/20; H04L 51/24; H04L 51/32; H04L 51/04;
(Continued)

(56) References Cited

U.S. PATENT DOCUMENTS 6,885,874 B2    4/2005    Grube et al.
7,305,365 B1    12/2007    Bhela et al.
(Continued)

FOREIGN PATENT DOCUMENTS

CA    2730925    1/2010
CA    2862618    7/2013
(Continued)

OTHER PUBLICATIONS

International Searching Authority: United States Patent and Trademark Office, International Search Report and Written Opinion, PCT Application No. PCT/US09/50870, dated Jul. 11, 2011, 8 pages.
(Continued)

*Primary Examiner* — Wayne H Cai
(74) *Attorney, Agent, or Firm* — Perkins Coie LLP

(57) ABSTRACT

A mobile application for integrating a location sharing event with a messaging platform such as a text messaging or email platform allows users to be prompted about location sharing when at least a part of the message includes location or time information. In one embodiment, the mobile application takes the form of an integrated location sharing application that parses the message to discern the relevant location or time information. The application may also provide a notification of a future event and may optionally generate a location sharing event based on the notification. In another embodiment, the application permits interactive route sharing between at least two computing devices.

15 Claims, 7 Drawing Sheets

Related U.S. Application Data continuation-in-part of application No. 13/054,075, filed as application No. PCT/US2009/050870 on Jul. 16, 2009, now Pat. No. 9,042,919.

(60) Provisional application No. 61/583,520, filed on Jan. 5, 2012, provisional application No. 61/081,313, filed on Jul. 16, 2008.

(51) Int. Cl.

| | | |
|---|---|---|
| *G01C 21/00* | (2006.01) | |
| *G01C 21/34* | (2006.01) | |
| *G01C 21/36* | (2006.01) | |
| *H04M 3/42* | (2006.01) | |
| *H04W 4/02* | (2018.01) | |
| *H04W 4/12* | (2009.01) | |
| *H04M 1/725* | (2006.01) | |

(52) U.S. Cl.
CPC ....... *G01C 21/362* (2013.01); *G01C 21/3614* (2013.01); *H04L 51/04* (2013.01); *H04L 51/046* (2013.01); *H04L 51/24* (2013.01); *H04L 51/32* (2013.01); *H04M 3/42348* (2013.01); *H04M 3/42382* (2013.01); *H04M 3/533* (2013.01); *H04W 4/02* (2013.01); *H04W 4/12* (2013.01); *H04M 1/72547* (2013.01); *H04M 1/72572* (2013.01)

(58) Field of Classification Search
CPC ............ H04L 51/046; H04M 1/72547; H04M 1/72572; H04M 3/553; H04M 3/42348; H04M 3/42382; G01C 21/00; G01C 21/3438; G01C 21/3614; G01C 21/362
USPC ............ 455/414.1, 414.2, 404.2, 456.1, 457; 701/532, 533
See application file for complete search history.

(56) References Cited

U.S. PATENT DOCUMENTS

| | | | |
|---|---|---|---|
| 7,366,522 | B2 | 4/2008 | Thomas |
| 9,042,919 | B2 | 5/2015 | Trussel et al. |
| 2001/0049274 | A1 | 12/2001 | Degraeve |
| 2002/0169539 | A1 | 11/2002 | Menard et al. |
| 2003/0060212 | A1 | 3/2003 | Thomas |
| 2006/0046744 | A1 | 3/2006 | Dublish et al. |
| 2007/0225902 | A1* | 9/2007 | Gretton ................ G01C 21/26 701/533 |
| 2007/0282621 | A1 | 12/2007 | Altman et al. |
| 2008/0036778 | A1 | 2/2008 | Sheha et al. |
| 2008/0091786 | A1 | 4/2008 | Jhanji |
| 2008/0103829 | A1 | 5/2008 | Mankopf et al. |
| 2008/0114539 | A1* | 5/2008 | Lim ....................... G01C 21/26 701/532 |
| 2008/0132251 | A1 | 6/2008 | Altman et al. |
| 2008/0147551 | A1 | 6/2008 | Connelly |
| 2008/0154489 | A1* | 6/2008 | Kaneda ............ G01C 21/3415 701/533 |
| 2009/0005018 | A1 | 1/2009 | Forstall et al. |
| 2009/0182498 | A1* | 7/2009 | Seymour ................ G01C 21/20 701/533 |
| 2009/0198645 | A1 | 8/2009 | Srikanth et al. |
| 2009/0215469 | A1 | 8/2009 | Fisher et al. |
| 2009/0292464 | A1 | 11/2009 | Fuchs et al. |
| 2009/0319172 | A1 | 12/2009 | Almeida et al. |
| 2009/0319616 | A1 | 12/2009 | Lewis, II et al. |
| 2010/0241723 | A1 | 9/2010 | Dornbush |
| 2011/0118975 | A1 | 5/2011 | Chen |
| 2011/0167371 | A1 | 7/2011 | Sheha et al. |
| 2012/0100875 | A1 | 4/2012 | Tysowski |
| 2013/0053074 | A1 | 2/2013 | Sanchez et al. |
| 2013/0096827 | A1 | 4/2013 | McCall et al. |
| 2013/0191483 | A1 | 7/2013 | Jhanji |
| 2013/0226453 | A1 | 8/2013 | Trussel et al. |
| 2015/0289102 | A1 | 10/2015 | Trussel et al. |

FOREIGN PATENT DOCUMENTS

| | | |
|---|---|---|
| CN | 104303463 | 1/2015 |
| EA | 023973 | 12/2011 |
| EA | 201170206 | 12/2011 |
| EP | 2308253 | 4/2011 |
| EP | 2817925 | 12/2014 |
| IL | 210680 | 8/2016 |
| JP | 11-051678 | 2/1999 |
| JP | 2002051373 | 2/2002 |
| JP | 2007102392 | 4/2007 |
| JP | 2007251402 | 9/2007 |
| JP | 2007310651 | 11/2007 |
| JP | 2012501561 | 1/2012 |
| JP | 2015505442 | 2/2015 |
| JP | 2015136189 | 7/2015 |
| KR | 20110063742 | 6/2011 |
| KR | 20140121417 | 10/2014 |
| KR | 101658943 | 9/2016 |
| RU | 2014132179 | 2/2016 |
| WO | WO-2010009328 | 1/2010 |
| WO | WO-2013103978 | 7/2013 |

OTHER PUBLICATIONS

International Searching Authority: European Patent Office, International Search Report and Written Opinion, PCT Application No. PCT/US13/20560, dated Oct. 2, 2014. 12 pages.

European Patent Office, European Search Report and Written Opinion, European Application No. 09798759.8, dated Jun. 21, 2016, 7 pages.

* cited by examiner

SYSTEMS AND METHODS FOR MOBILE COMMUNICATION INTEGRATION

PRIORITY CLAIM

The present application is a continuation of and claims priority to and the benefit of U.S. patent application Ser. No. 13/735,840 filed on Jan. 7, 2013, which in turn claims priority to and the benefit of U.S. Provisional Application No. 61/583,520 filed on Jan. 5, 2012. Thus, the present application claims priority to and the benefit of the filing date of U.S. Provisional Application No. 61/583,520 filed on Jan. 5, 2012.

The present application is also a continuation-in-part of and claims priority to and the benefit of U.S. patent application Ser. No. 13/054,075 filed on Sep. 6, 2011, which in turn is a 371 National Stage of and claims priority to and the benefit of PCT/US2009/050870 filed on Jul. 16, 2009, which in turn claims priority to and the benefit of U.S. Provisional Application No. 61/081,313 filed on Jul. 16, 2008. Thus, the present application also claims priority to and the benefit of the filing date of U.S. Provisional Application No. 61/081,313 filed on Jul. 16, 2008.

All the contents of the following patent applications are hereby incorporated by reference in the present application:
U.S. patent application Ser. No. 13/735,840;
U.S. Provisional Application No. 61/583,520; and
U.S. patent application Ser. No. 13/054,075.

FIELD OF THE INVENTION

The present invention generally relates to an application operable on a mobile communications device that allows for sharing of location information, and more specifically relates to an application operable on a mobile communications device that provides an analysis of at least one communication modality in conjunction with or independent from the location information, and a visual display of contextually relevant information to one or more users.

SUMMARY

In one embodiment, the present invention generally relates to systems and methods that utilize computer-readable instructions for integrating a location sharing event with a messaging platform. In another embodiment, the present invention generally relates to systems and methods that utilize computer-readable instructions for providing notification of a future event and may optionally generate a location sharing event based on the notification. In yet another embodiment, the present invention generally relates to systems and methods that utilize computer-readable instructions for sharing routes between at least two computing devices.

In one aspect of the present invention, a method for integrating a messaging conversation with a location sharing event includes the steps of (1) receiving a message through a first communication mode; (2) parsing the message to determine whether the message includes an indication of time, an indication of location, or both; and (3) upon determining one of the indications, providing a prompt to a recipient of the message to send the location sharing event to a sender of the message.

In another aspect of the present invention, a method for providing notification of a future event includes the steps of (1) communicating at least one message between at least two computing devices; (2) analyzing a context of the at least one message to determine whether the message includes an indication of a future time commitment for a user of at least one of the two computing devices; and (3) generating a notification reminder of the future time commitment to the user of at least one of the two computing devices.

In yet another aspect of the present invention, a method for sharing routes between at least two computing devices includes the steps of (1) displaying a map on a display screen of first computing device; (2) generating a route from a first location to a second location based on an approximate route indicated on the map by a user of the first computing device; and (3) sending the map to the second computing device.

BRIEF DESCRIPTION OF THE DRAWINGS

In the drawings, identical reference numbers identify similar elements or acts. The sizes and relative positions of elements in the drawings may not be necessarily drawn to scale. For example, the shapes of various elements and angles may not be drawn to scale, and some of these elements may be arbitrarily enlarged or positioned to improve drawing legibility.

DETAILED DESCRIPTION

Embodiments of the invention may be operational with numerous general purpose or special purpose computing system environments or configurations. Examples of well known computing systems, environments, and/or configurations that may be suitable for use with the invention include, but are not limited to, personal computers (PCs), servers, networked computing systems, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In one embodiment, the present invention generally relates to systems and methods that utilize computer-readable instructions for integrating a location sharing event with a messaging platform. In another embodiment, the present invention generally relates to systems and methods that utilize computer-readable instructions for providing notification of a future event and may optionally generate a location sharing event based on the notification. In yet another embodiment, the present invention generally relates to systems and methods that utilize computer-readable instructions for sharing routes between at least two computing devices.

Figure 1:
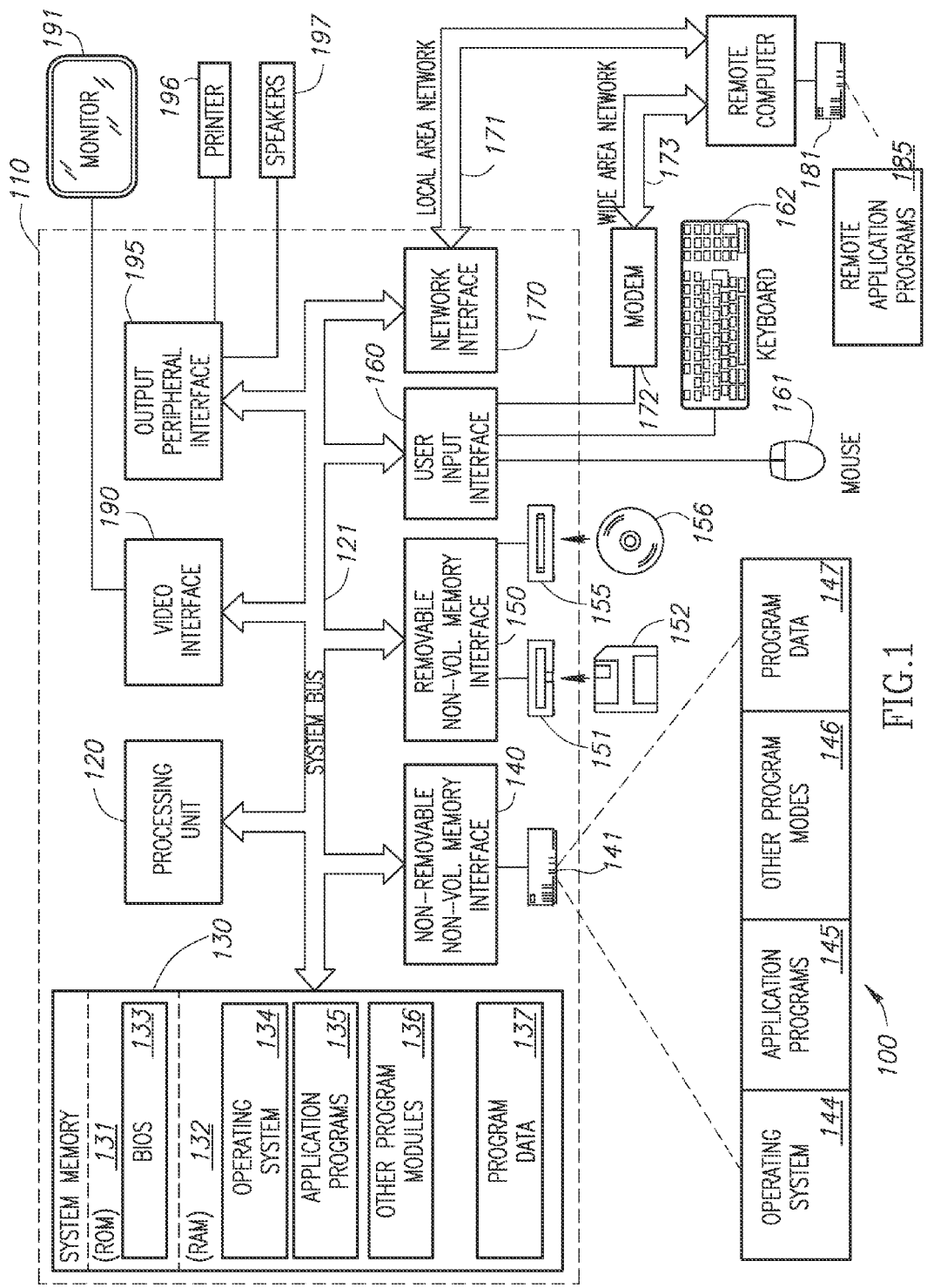
FIG. 1 is a diagram showing a suitable computing environment, such as a personal computer or personal mobile computing device, for practicing the systems and methods of various embodiments of the subject matter disclosed herein.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media may include volatile and nonvolatile media, and/or removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
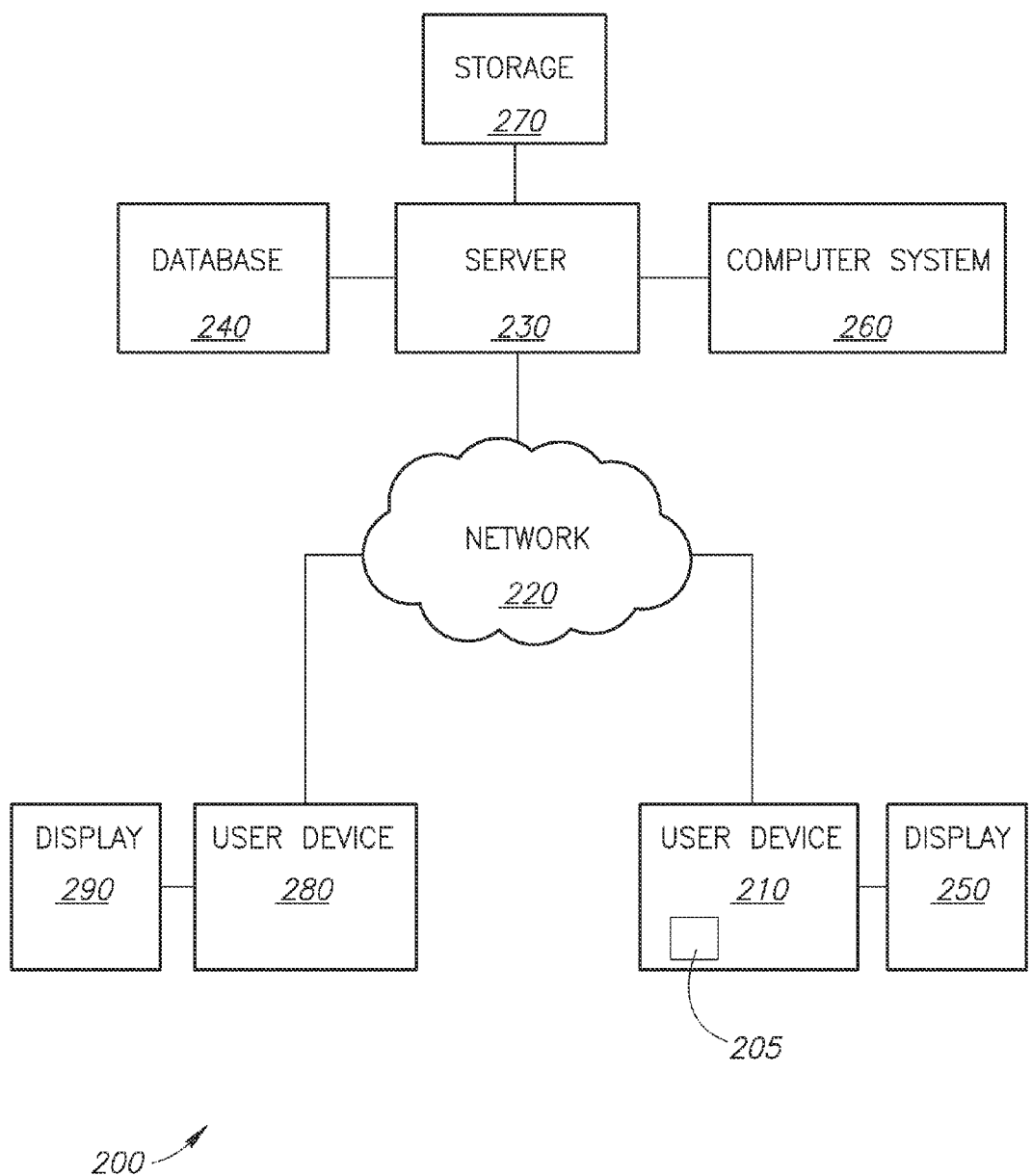
FIG. 2 shows a diagram of a suitable networked computing environment wherein a user may employ the various systems and methods of the subject matter disclosed herein.

Referring now to FIG. 2, an embodiment of the present invention can be described in the context of an exemplary computer network system 200 as illustrated. System 200 includes electronic user devices 210, 280, such as cellular or mobile telephones, personal computers or workstations, that are linked via a communication medium, such as a network 220 (e.g., the Internet), to an electronic device or system, such as a server 230. The server 230 may further be coupled, or otherwise have access, to a database 240, electronic storage 270 and a computer system 260. Although the embodiment illustrated in FIG. 2 includes one server 230 coupled to two user devices 210, 280 via the network 220, it should be recognized that embodiments of the invention may be implemented using two or more such user devices coupled to one or more such servers. Moreover, the network 220 may include or otherwise be coupled to one or more telecommunication towers (not shown) that provide network connectivity to one or more cellular or mobile telephones.

In an embodiment, each of the user devices 210, 280 and server 230 may include all or fewer than all of the features associated with the computer 110 illustrated in and discussed with reference to FIG. 1. User devices 210, 280 include or are otherwise coupled to a computer screen or display 250, 290, respectively. User devices 210, 280 can be used for various purposes including both network- and local-computing processes.

Figure 3:
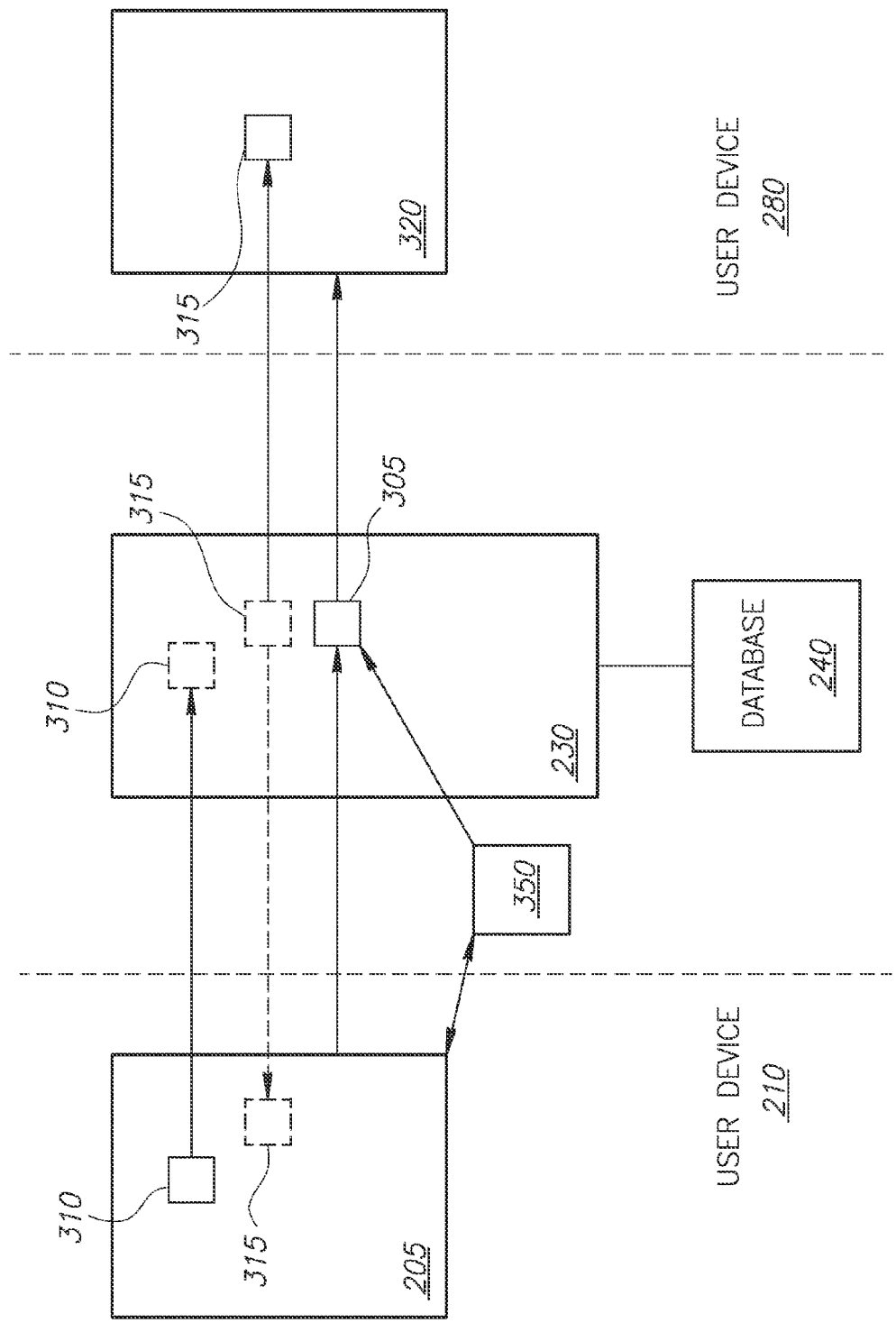
FIG. 3 shows a diagram of a suitable networked computing environment wherein a user may employ the various systems and methods of the subject matter disclosed herein.

The user devices 210, 280 are linked via the network 220 to server 230 so that computer programs, such as, for example, a browser or other applications, running on the user devices 210, 280 can cooperate in two-way communication with server 230. Server 230 may be coupled to database 240 and/or electronic storage 270 to retrieve information therefrom and to store information thereto. Moreover, and as best illustrated in FIG. 3, the server 230 may communicate with the user device 210 (and/or device 280) and/or GPS/triangulation systems 350 known in the art in such manner as to allow the server 230, using map data stored in the database 240, to generate location data 305, such as, for example, HTML data, that may be used by a browser or similar application to display the location of the device 210 (and/or device 280). Additionally, the server 230 may be coupled to the computer system 260 in a manner allowing the server to delegate certain processing functions to the computer system.

Referring to FIGS. 2 and 3, an embodiment includes a client-side application 205 executable on, for example, user device 210. Upon a command of a user of the device 210, the application 205 is operable to send to the server 230 a request 310, including identifying information (e.g., email address, phone number, a service subscriber's user name, etc.) of a user of the user device 280 (or other similar user device), to create authorization data (i.e., a "ticket") that will allow the user of the user device 280 (or the user of the other similar user device) to track the location of the user device 210 and, consequently, the user of the device 210. The application 205 is configured to provide a user interface (not shown) displayable on the display 250. The user interface functions to enable the user of the device 210 to select or otherwise input one or more values defining the start time and/or length of a time interval during which the user of the user device 280 may track the location of the device 210. These values are included in the request 310.

In response to the request 310, the server 230 is configured to generate the ticket 315 and forward the ticket to the user device 280. Alternatively, as indicated in dashed lines in FIG. 3, the server may provide the ticket 315 to the user device 210, whereupon the device 210 may then be used to forward the ticket to the user device 280. The ticket 315, which may be sent via SMS, email, or other suitable messaging format, includes pointing data, such as a selectable link to a URL, that, when selected by the user of the device 280, is configured to provide access to a tracking interface provided by the server 230. The ticket 315 may further include a default message or a customized message input by the user of the device 210.

Specifically, if the user of the device 280 selects a link to the pointing data, the server 230 is configured to provide location data 305 to the device 280 enabling a client application 320, a browser, or other interface resident on the device 280 to generate a display of the geographical location of the device 210. Advantageously, an embodiment merely requires a conventional browser be resident on the device 280 to display the location of the device 210, and does not otherwise require a specific application be installed on the device 280 to do so. The location data 305 may be provided to the device 280 in a recurring manner, such that the user of the device 280 may view the real-time movement of the device 210, or may be provided singly so as to merely provide a "snapshot" of the location of the device 210.

In an embodiment, the server 230 provides the location data 305 to the device 280 only during the time interval designated by the user of the device 210 in generating the request 310. In various embodiments, the user of the device 210 may set the time interval to commence upon the user device 280 first accessing the location data, set the time interval to occur during a specifically designated window of time (e.g., 2-3 PM of a particular day or set of days), or to occur at any other user-specified start and stop time. In an embodiment, the ticket 315 received by the user of device 280 may indicate the nature (e.g., time of commencement, duration, etc.) of the time interval. Additionally, in an alternative embodiment, the user of the device 210, rather than provide the time interval in the request 310 prior to the location data 305 being provided to the device 280, may provide and effectuate the time interval in a request after the device 280 has received the location data and begun tracking the device 210. Similarly, after the device 280 has received the location data and begun tracking the device 210, the user of the device 210 may revoke, or otherwise modify, the effective time interval originally included in the request 310 provided before generation of the ticket 315. Additionally, a particular ticket 315 may be extended to a user other than and additional to the user of device 280. In such case, the ticket may track absolute time remaining. As such, if the ticket 315 is a 30 minute ticket sent 20 minutes ago, it will expire in 10 minutes for both the old and new recipient. Additionally, a predefined, external event may function to modify the sharing-permission time interval. For example, the user of the device 210 may specify that the ticket 315 is valid only until the user has arrived at a user-specified destination. Alternatively, for example, the user of the device 210 may specify that the ticket 315 is valid only upon the user being a predetermined distance (e.g., one mile) from the user's departure location.

In an embodiment, the request 310 may further include an indication of a landmark to which the user and the user device 210 are travelling. Consequently, the server 230, by employing the map data associated with the database 240, may include the geographical location of the landmark with the location data 305.

It should be noted that, in an embodiment, all of the functionality discussed above as attributable to the server 230 may instead be performed solely by the application 205 executing on the user device 210 communicating directly with the user device 280 over the network 220. In such an embodiment, the request 310 need not be generated, and the ticket 315 is generated by the user device 210 and issued directly to the user device 280. In such an embodiment, the user device 210 may constantly, or otherwise periodically, send updates to the user device 280 until a time interval associated with a ticket 315 expires. Alternatively, the user device 280 may include an application configured to constantly, or otherwise periodically, poll the user device 210 for location data. As such, in varying embodiments, the server 230 is not necessary for implementation of the functionality described herein.

For purposes of the description herein, an embodiment of the present invention is directed to an integrated location sharing application that controls the process of sending or receiving a location message. By way of example, the integrated location sharing application may advantageously provide an easier and faster way to communicate as compared to a phone call or text message regarding the whereabouts of a sender and/or a recipient.

An Internet-enabled device such as, but not limited to, a mobile phone or a computer may receive a location message. In one embodiment, no software or setup is required to receive and potentially view the location message. A sender may send the location message to a specific person, several people, or even to a social networking site or group. For purposes of brevity hereinafter, the "recipient" may refer to one person, group, site, namespace, or more than one person, group, site, or namespace.

More specifically, the integrated location sharing application may take the form of an application downloaded onto a location-enabled mobile communications device that allows the sender to share their location via a map for a pre-set period of time with any recipient of the sender's choosing. With the integrated location sharing application, the sender remains in complete control on who sees their location, when they see their location and for how long they can view the sender's location.

Unlike other location-based services that require users to log in and build a friend network before use, the integrated location sharing application may be used within seconds of downloading to a location-enabled mobile communications device such as, but not limited to a GPS-enabled mobile smartphone device. In one embodiment, the integrated location sharing application does not require the sender or the recipient to create an account to use the service, which eliminates login and password hassles.

Once downloaded, the sender may send a location message to any recipient by selecting a contact or contacts, choose a duration they want their location to be available to the recipient, and then hit send on their mobile communications device. The integrated location sharing application permits the sender to set a timer for how long their location may be shared. The sender has the ability to "pause" or "cancel" the location message at any time or choose to extend a current location message. On the receiving end, the recipient merely needs an Internet-enabled device or email access to receive the location message and view sender's whereabouts on a map. By way of example, the recipient receives an SMS or email message with a unique URL that can be clicked to open a browser window having a map displaying the sender's precise location in a context of other landmarks, streets, etc.

In one embodiment of the present invention, the integrated location sharing application interfaces with a text message, a URL link, and/or an email platform that resides on the sender's mobile communications device. The integrated location sharing application may also interface with other types of input such as, but not limited to, gesture input, motion detection, third party transmissions, radio frequency identification information, or other scenario-based automated inputs.

By way of example, the integrated location sharing application may receive a text message, parse the text message, and then analyze the parsed text message to determine key words, abbreviations, symbols or other text that may be related to time and/or location. The integrated location sharing application analyzes a context of a messaging conversation and may then provide an inline and real-time display of the analyzed, contextual information of the current messaging conversation through parsing and/or manipulation of the text message.

The integrated location sharing application may perform various parsing, analyzing and displaying techniques, which are described in detail below. It is appreciated that these techniques may be performed independently, in a different sequence, and/or in any desired combination. Further, the integrated location sharing application may perform the parsing, analyzing and displaying techniques using other modes of communication besides a text or email message, for example using voice recognition software to parse and analyze a real-time phone conversation or a voicemail message.

The integrated location sharing application may utilize text parsing to initiate an action based on a context of the message. From a contextual analysis, the integrated location sharing application could determine if information about the sender's or recipient's location would be useful to share. For example, a person may text message a friend to say "I'm running late." The integrated location sharing application would parse the text message and recognize the context deals time (i.e., "late") and relative position (i.e., "running"). Accordingly, the integrated location sharing application would prompt the person, the friend or both to share their respective location. In one embodiment, the integrated location sharing application may automatically share the parties' real-time locations because they have identified each other as friends or favorites. In another example, the integrated location sharing application may prompt one or both of the parties to modify and/or update their respective location information. For example, one of the parties may say "I'll need to stop at the store on the way" or "I'll take the bridge instead." Additionally or alternatively, the integrated location sharing application may be used for non-location sharing scenarios such as, but not limited to, purchasing items, making reservations, or searching for coupons.

The integrated location sharing application parses the text message to search for native language location and/or time information such as, but not limited to, an address, an establishment name, a landmark name, a departure time, traffic congestion, etc. The native language is parsed, analyzed and then mapped within the context of the text message or other mode of communication.

Figure 4:
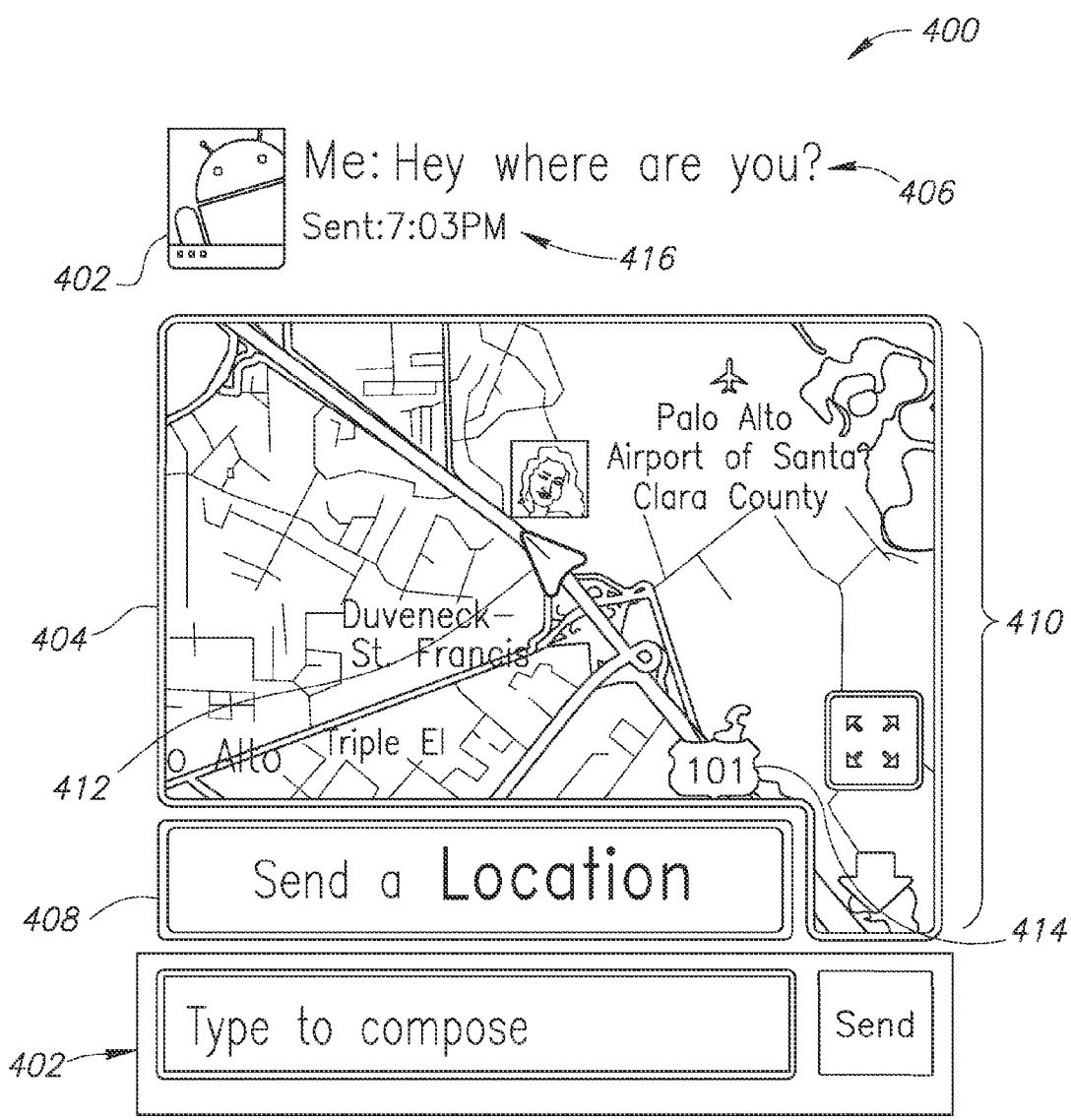
FIG. 4 is a diagram of a graphical user interface for an integrated location sharing application capable of parsing messages according to an embodiment of the present invention.

FIG. 4 shows a user interface 400 for the integrated location sharing application, which includes an integrated messaging client 402 to send and/or receive messages and an integrated mapping client 404 to share location information. In the illustrated embodiment, the integrated location sharing application on a first mobile communication device in the possession of a first person sends out a first text message 406 that says "Hey where are you?" A second person also having the integrated location sharing application on a second mobile communication device in possession of a second person receives the first text message 406, and the integrated location sharing application would parse the first text message 406 and then analyze it for time and/or location information. In this example, the term "where" would provide a prompt 408 for the second person to respond with an option to share the second person's location information with the first person. The prompt 408 may be sent as a link (e.g., http://location.com/abc-123) to the first person. Upon the first person activating the link, the first mobile communication device would visually display a map 410 showing a current location 412 of the second person relative to one or more geographic identifiers 414 (e.g., road names, landmark names, etc.).

In addition, the integrated location sharing application may utilize a messaging time stamp 416 that may be cross referenced with known locations at those times. By way of example, the messaging time stamp 416 may be displayed on the map 410 according to a real-time, geographic location when the text message 406 was sent as well as time stamp 416. As an added feature, a time adjuster at the bottom of the map 410 may be used to select specific parts of the text message 406 timeline. By way of example, a time adjuster is shown in the progress bar 418 of FIG. 5 as text "+15 minutes." In another embodiment, dynamic content and/or contextual information may be displayed on the device. For purposes of this description, dynamic content may be content such as, but not limited to, information that changes about the user, such as user's location or status, broadcasting vs. not broadcasting. Contextual information may be information such as, but not limited to, restaurant ratings, video, images, etc. that may be used to augment an existing text conversation. The dynamic content and/or contextual information may be displayed within the text message 406 and it may be accessed and displayed in real-time. To switch between a messaging view and a map view, a user of the integrated location sharing application may swipe left/right or up/down on the display screen of or alternative input mechanism related to the computing device.

According to the illustrated embodiment, the context and/or content of the messaging conversation may be parsed to prompt location sharing between two or more parties. The content of these incoming messages may be modified depending on the receiving client. The modifications may or may not include the original messages or slight modifications to the original messages. Within the context of the messaging conversation commands can be made to other applications to act upon. For example, if within the context of the messaging conversation a person sends, "Send Location" to one or more email or phone contacts and selects an activation time of thirty minutes, then the sender's location may be viewed by the recipient for thirty minutes or until the sender purposefully expired the location sharing. Additionally or alternatively, the basic text of the messaging conversation may be adjusted dependent on an accuracy of the sender's location. In one embodiment, the message conversation accompanying reverse geo-coded information may be adjusted based on the accuracy of the sender's location that is being reverse geo-coded. For example, the word "around" could be used when accuracy is over a certain distance and the word "at" could be used when accuracy is under a certain distance.

Figure 5:
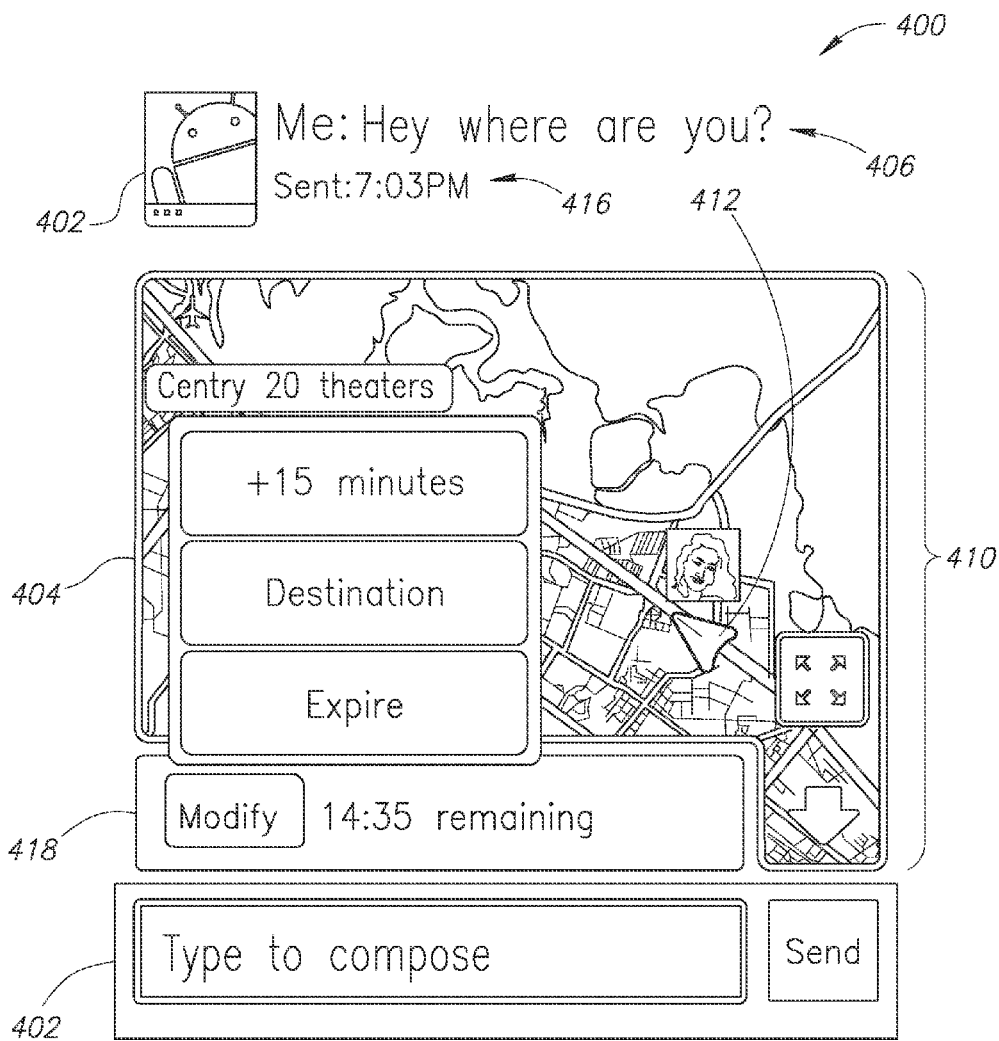
FIG. 5 is the diagram of FIG. 4 showing optional menu items for modifying a location sharing event according to an embodiment of the present invention.

FIG. 5 shows a progress bar 418 of an amount of time remaining for a location sharing event. In addition, an option menu 420 may extend from the progress bar 418. By way of example, the option menu 420 may provide the sender the option to extend a time amount of the location sharing event, have the location sharing event expire upon reaching a selected destination, or simply expire at a present time. The option menu 420 may include additional options, different options or fewer options. In one embodiment, a freshness of the location sharing event may be displayed in a conversation view. The conversation view may comprise a list of people and/or conversations that includes a visual element to indicate the freshness, which in turn may take the form of a color treatment or an icon as shown in FIG. 4.

Still referring to FIG. 5, the freshness indicator of a color of a location indicator, shown as arrow. In another embodiment, the freshness indicator may take the form of a countdown timer, an animated icon, audible sounds (accuracy rings, ping sound) or some other human perceptible signal. In any embodiment, the freshness indicator would provide a viewer a signal about the freshness of the sender's location.

The indication of freshness informs the parties that are currently involved in the location sharing event a time of a most recent location for the sender and whether the recipient is currently sharing the recipient's location with sender. Additional information may also be displayed in conversation view such as, but not limited to, a relative distance between the sender and recipient (or vice-versa), a heading of the sender and/or recipient, an estimated time of arrival at a destination for the sender and/or the recipient, a current city, state or region, and a last check-in location for the sender and/or recipient.

Figure 6:
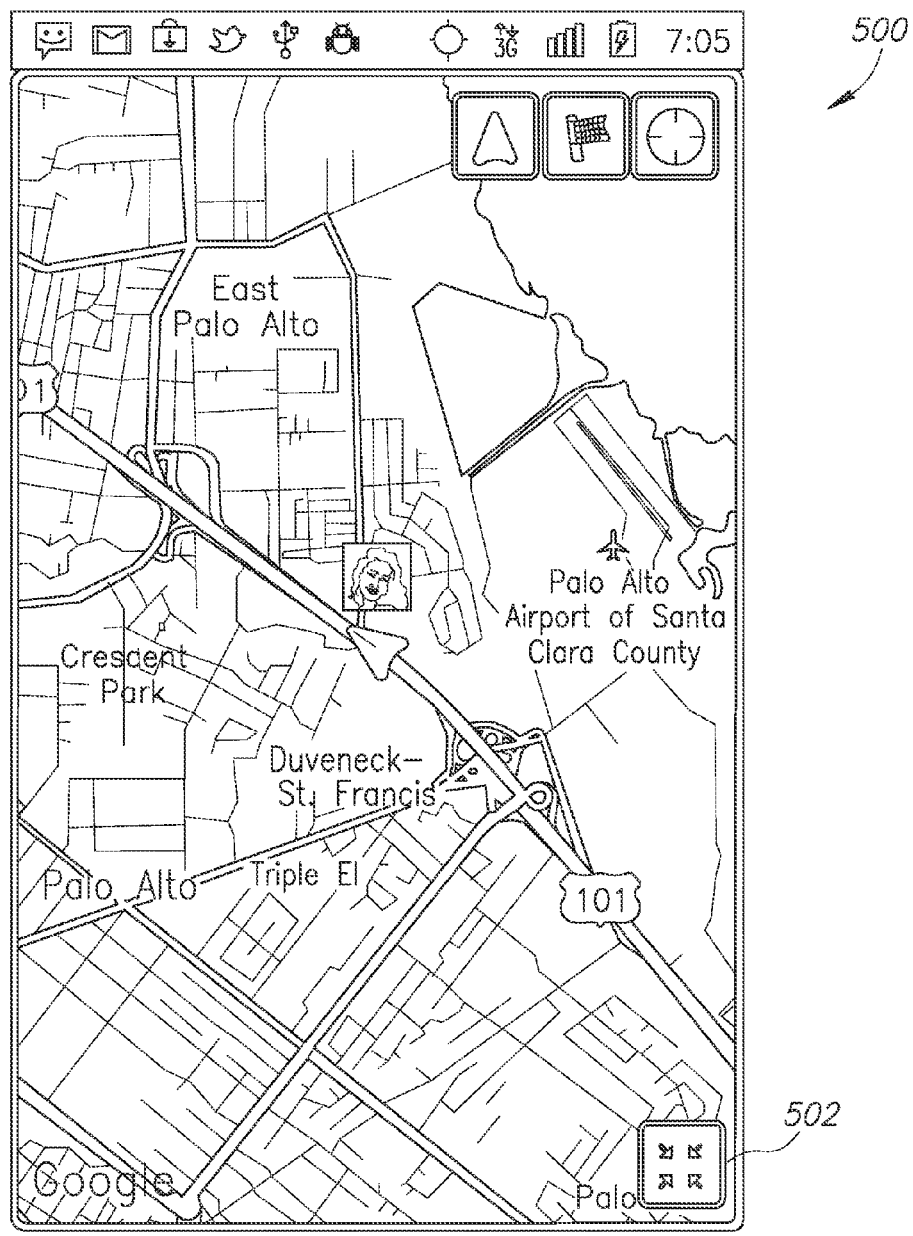
FIG. 6 is a displayed map having a dynamic zoom feature according to an embodiment of the present invention.

FIG. 6 shows a map 500 of a location sharing event between a sender and a recipient. The map 500 may take the form of an interactive map having a dynamic zoom button 502. In the illustrated embodiment, the map 500 may automatically adjust a zoom level to an appropriate size to allow for features that they viewer has selected to be shown on the map 500 and stay visible on the map 500. Because of the dynamic nature of the map location features, the zoom level may be continually adjusted to accommodate for these changes. In one embodiment, multiple buttons may be shown on the map and these buttons may be toggled to select which features should appear on the map. As a result, the map may automatically resize (i.e., adjust zoom level) to optimally display the selected features on the map.

Figure 7:
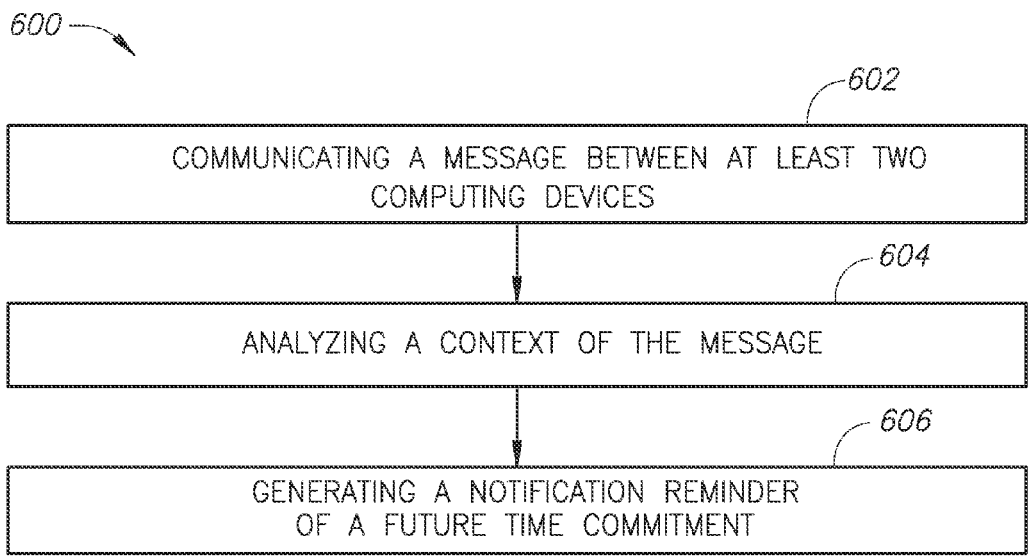
FIG. 7 is a flowchart showing a method for generating notifications of future events using an integrated location sharing application according to an embodiment of the present invention.

FIG. 7 shows a method 600 for providing notification of a future event using an integrated location sharing application according to an embodiment of the present invention. At step 602, at least one message is communicated between at least two computing devices. At step 604, a context of the message is analyzed to determine whether the message includes an indication of a future time commitment for a user of at least one of the two computing devices. At step 606, a notification reminder of the future time commitment is generated to the user of at least one of the two computing devices. By way of example, a contextual analysis of the message initiates the notification reminder, which may take the form of an alarm, a scheduled time on a calendar, or another type of message on one of the computing devices. If the recipient receives a message saying "Meet at a desired destination at 4 pm" and responds "Ok," the integrated location sharing application may prompt the recipient with a text message to leave at a particular time so that the recipient arrives at the desired destination on time. The integrated location sharing application accounts for the recipient's current location to correlate the timing of when the text message is sent to the recipient. Upon the recipient departing from the recipient's current location, the integrated location sharing application may automatically send a message to the sender that the recipient is "leaving now" or some other phrase that indicates to the sender that the recipient is on the way.

Figure 8:
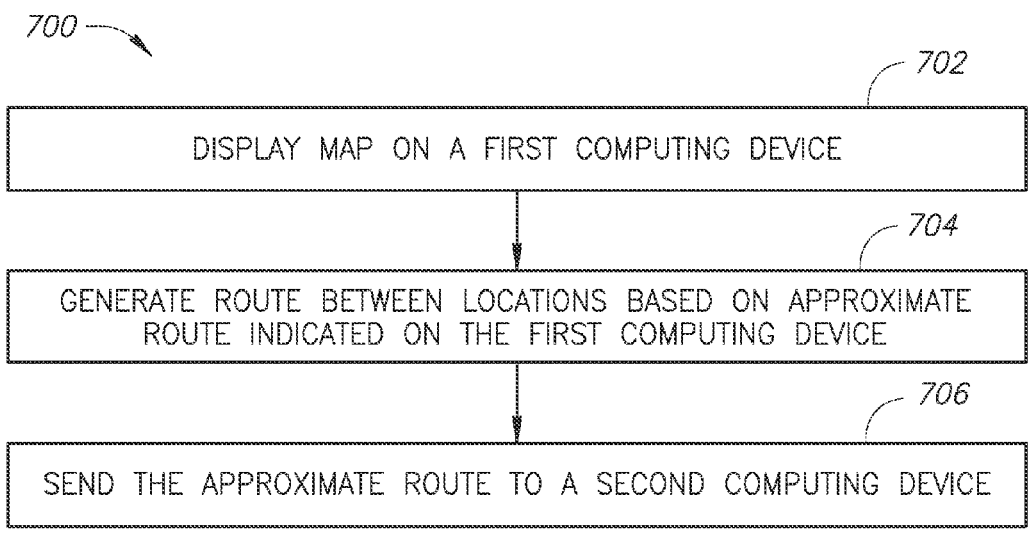
FIG. 8 is a flowchart showing a method for sharing routes using an integrated location sharing application according to an embodiment of the present invention.

FIG. 8 shows a method 700 for sharing routes between at least two computing devices that are each using an integrated location sharing application according to an embodiment of the present invention. At step 702, a map on a display screen of a first computing device is displayed. At step 704, a route from a first location to a second location is generated based on an approximate route indicated on the map by a user of the first computing device. The approximate route may be indicated by a finger, a stylus or some other instrument capable of interacting with a display screen of the first computing device. At step 706, the approximate route is sent to the second computing device where the approximate may be modified or revised by a user of the second computing device.

For example, a first user creates the approximate route with a finger on a map displayed on the first computing device. In this example, the approximate route may be generally imprecise, but could be automatically modified (e.g., "snapped") to take the form of a more precise route based on known geographical features on the map. The approximate route or the snapped route may be sent to a second computing device (or multiple other computing devices) to be used as a guide for navigation or for confirmation.

Once received by the second computing device, a user of the second computing device may modify or revise the route by moving parts of or moving the entire route, again using a finger, stylus or some other device capable of interacting with a display screen of the second computing device. Subsequently, the modified map may be sent back to the first computing device or other computing device.

In another embodiment, the approximate map or the modified map may be shared in a real time display with one or more computing devices. For example, if one user centers the approximate map or the modified map on a particular landmark then other users viewing the map will also see their map centered on the particular landmark.

In another example of the present invention, the integrated location sharing application may allow a user to look up friend on a social network, import location information, as well as add other elements such as photos, check-ins etc. Peripheral information gathered from social networks and other web sources may be included on the map to give the user more information about their communication partners. This information could include, but is not limited to, social network check-ins, TWITTER® messages, images, social network posts, etc. The location information does not need to be sent directly to the user for it to be displayed. If relevant geo-coded information may be mined from multiple information sources, then it may be displayed to the user. For example, if a location message is posted to a social networking site, but not sent directly to the user, the integrated location sharing application may still display that location information because it is pertinent. In short, the integrated location sharing application may gather and aggregate (and possibly extrapolate) information from other databases and networks. Permissions for access may vary by data source.

By way of example, the recipient may see the sender on a map and also seeing the last place the sender rated on a social rating site, such as YELP® review site, a recent FOURSQUARE® location check-in, and/or a recent TWITTER® message, which may be displayed in a text bubble over the recipient's icon. The idea is to leverage social networks and other internet searches/databases that a first user is signed into/has access to find all relevant information about a second user when the first user is looking at their communication with second user. Additionally, the leveraging of social networks may be done in a contextual manner, informed by the contents of the communication between the users.

In one embodiment, a location of a chat participant from a social network may be requested by a single button touch.

The integrated location sharing application may also include one or more non-visual interaction methods and elements. By way of example, text commands could be typed within the messaging conversation. These commands would not necessarily be transmitted to a conversation partner, but rather intercepted or parsed by the integrated location sharing application to show information. For example, if a map is shown in the messaging conversation, the viewer could type, "show traffic" to traffic information on the map. The message may not, but could, be transmitted to the conversation partner, but rather interpreted by the integrated location sharing application and information is displayed accordingly.

The integrated location sharing application may also allow for a request of location information sent by the sender with predefined location sharing parameters such as, but not limited to destination, updates speed, messages, etc. The recipient of the request may change the sharing parameters before initiating the location sharing event.

In another embodiment, the integrated location sharing application may permit the recipient to receive real-time location updates and estimated time or arrival notifications from a conversation partner or sender. The recipient may set a parameter that asks for a notification when the conversation partner is a defined amount of time or distance away, or when a defined external even occurs, for example when the sender leaves a store or other location.

In yet another embodiment, real-time relative location notifications may take into account the sender's current location and the sender's destination, and potentially other impacting information (e.g. transportation mode, traffic) to determine an approximate time for the recipient to meet the sender at the same destination. For example, if the recipient receives a message from the sender saying, "I'll be at a particular destination in thirty minutes" and the sender is ten minutes from the particular destination then the recipient may receive a prompt to leave their current location in twenty minutes to meet the sender at the particular destination. In one embodiment, the prompt may take the form of a calendared event or an alarm notification on the recipient's device.

The aforementioned embodiment provides an application of smart notifications, such as when a user has an appointment that is thirty minutes away with traffic, so the application provides a notification to leave for that destination thirty minutes before the scheduled appointment. Additionally or alternatively, the aforementioned embodiment may provide contextual notifications, which may be when communication between users to coordinate meeting at a particular place at a particular time, In yet another embodiment, the integrated location sharing application may include a map button displayed on a map that reflects a relative timeliness of recent location information by signifying that there is location information within the context of a current conversation. By way of example, the map button may indicate speed, heading, proximity, etc.

In another embodiment, a displayed map may include colors representing different users, coordinates etc. For example, different color location indicators may be used to differentiate various locations of different users. Additionally, the color indicators may be used to indicate text messages and other information posted or sent by that user such as, but not limited to, geo-coded images, suggested destinations, points of interest, etc.

Further, the displayed map may include alerts when a location is requested. By way of example, a location request may be pushed to a recipient where the recipient is asked to confirm, deny or modify the request. Additionally, parameters by be put into place by the recipient to automatically confirm, deny or modify the request without the sender's interaction.

In another embodiment, the displayed map may provide for a group location display for group conversations in which individual locations may not necessarily be displayed, but instead an aggregate of the group location may be displayed. The aggregate may take the form of a center of mass or area display in which the center of mass or area may be represented by a mean distance between all location participating members of the group. The aggregate may include different specific regions of density. An optionally, the aggregate may take the form of a heat map.

Other embodiments of the integrated location sharing application may include location based advertisements displayed to a viewer depending on the sender's location. The application may include coupons or gift certificates that may be sent to recipient depending on their location, which may be updated in real-time based on an actual or predicted path or previous location behavior.

In one embodiment, the integrated location sharing application may provide for joint decision making in which a group of users within a conversation may display contextual visual information relevant to their current conversation. The application may prompt one or more users to make a decision. By way of example, a group of students are chatting about where they want to have dinner tonight, so the application recognizes the context of time and location and displays reviews for places in the area. The users may be asked to vote on where they would like to eat.

In still yet another embodiment, the integrated location sharing application may provide for close contact and/or token contact between user. Close contact may take the form of a location sharing relationship created by actual or close contact between mobile devices. The sharing of location information may expire in a predetermined amount of time, or may be individually turned off, or could stop depending on external events either automatically or manually. Token contact may be when two users briefly tap mobile devices to establish a token which may then be shared with other persons or groups by either person. The token may provide rights such as a permission to share location information with others who have been tapped.

The various embodiments described above can be combined to provide further embodiments. All of the above U.S. patents, patent applications and publications referred to in this specification are incorporated herein by reference. Aspects can be modified, if necessary, to employ devices, features, and concepts of the various patents, applications and publications to provide yet further embodiments.

These and other changes can be made in light of the above detailed description. In general, in the following claims, the terms used should not be construed to limit the invention to the specific embodiments disclosed in the specification and the claims, but should be construed to include all types of media imaging, media cutting and media processing that operate in accordance with the claims. Accordingly, the invention is not limited by the disclosure, but instead its scope is to be determined entirely by the following claims

The invention claimed is:

1. A method for sharing routes between at least two computing devices, the method comprising:
  causing a map to be displayed on a display screen of a first computing device;
  generating a route from a first location to a second location based on an approximate route indicated on the map by a user of the first computing device,
    wherein the approximate route specifies an entire route between the first location and the second location; and
    wherein generating the route is performed, as least in part, by automatically modifying a portion of the approximate route to more closely conform to features of the map;
  sending an indication of the generated route to the second computing device;
  receiving revisions to the route from the second computing device; and
  causing the a revised route to be displayed on the first computing device;
  wherein displaying the revised route on the first computing device includes displaying a textual messages received from teh second computing device.

2. The method of claim 1, further comprising:
  causing display of a second map on a display screen of the second computing device,
    wherein the display of a second map includes indications of the generated route, and
    wherein the revisions to the route are indicated through interactions on the second map by a user of the second computing device; and
  sending the revised route to the first computing device;
  wherein the displaying of the map on the display screen of the first computing device includes displaying a textual message within a proximity of the map, and
  wherein displaying the map on the display screen of the second computing device includes displaying the textual message within a second proximity of the second map.

3. The method of claim 1, further comprising sending a message, that is from the second computing device and is directed to the first computing device, to accept the route.

4. The method of claim 1, wherein displaying the map on the display screen of the first computing device includes location data imported from a social networking site.

5. A computer-readable medium, excluding transitory, propagating signals, and storing instructions that, when executed by one or more processors, cause the one or more processors to:
  display a map on a display screen of first computing device;
  generate a route from a first location to a second location based on an approximate route indicated by a user,
    wherein the approximate route specifies an entire route between the first location and the second location; and wherein the approximate route is indicated by the user, at least in part, by the user tracing a portion of the approximate route of the map;

send an indication of the generated route to the second computing device; and send a message regarding acceptance of the approximate route, wherein the map displayed on the display screen of the first computing device includes location data imported from a social networking site.

6. The computer-readable medium of claim 5, wherein the instructions, when executed by the one or more processors, further cause the one or more processors to:

receive route revisions from the second computing device; and cause a route, based on the route revisions, to be displayed on the first computing device.

7. The computer-readable medium of claim 5, wherein the second computing device displays a second map including an indication of the generated route, receives revisions to the generated route indicated on the second map, and sends a revised route back to the first computing device, and wherein the instructions, when executed by the one or more processors, further cause the one or more processors to:

display the revised route on the map on the display screen of the first computing device, wherein displaying the map on the display screen of the first computing device includes displaying a textual message, from the second computing device, within a proximity of the map.

8. The computer-readable medium of claim 5 wherein displaying the map on the display screen of the first computing device includes displaying a textual message, from the second computing device, within a proximity of the map.

9. The computer-readable medium of claim 5, wherein generating the route is performed, at least in part, by automatically modifying a portion of the approximate route to more closely conform to features of the map.

10. A system for sharing routes between at least two computing devices, the system comprising:

means for displaying a map on a display screen of first computing device;

means for generating a route from a first location to a second location based on an approximate route indicated by a user, wherein the approximate route specifies an entire route between the first location and the second location; and wherein the means for generating the route include means for automatically modifying a portion of the approximate route to more closely conform to features of the map;

means for sending an indication of the generated route or the approximate route to the second computing device; and means for receiving, at the first computing device, revisions to the generated route or the approximate route, wherein the revisions were provided by the second computing device, wherein the revisions are associated with a textual message that is received from the second computing device and that is displayed on display screen of first computing device.

11. The system of claim 10, further comprising:

means for displaying a revised route on the map on the display screen of the first computing device, wherein the revisions were provided by the second computing device, and means for providing display of a textual message within a proximity of the revised route on the map.

12. The system of claim 10, further comprising means for sending a message to accept the approximate route.

13. The system of claim 10, wherein the means for displaying the map on the display screen of the first computing device is configured to import location data from a social networking site.

14. The system of claim 10, wherein the means for displaying the map on the display screen of the first computing device is configured to display the textual message within a proximity of the map.

15. The method of claim 1, wherein the approximate route is indicated by the user, at least in part, by the user tracing a portion of the approximate route on the map.

* * * * *